United States Patent
Sun et al.

(10) Patent No.: US 9,835,199 B2
(45) Date of Patent: Dec. 5, 2017

(54) METAL MATRIX SELF-LUBRICATING COMPOSITE AND MANUFACTURING METHOD THEREFOR

(71) Applicant: ZHEJIANG CHANGSHENG SLIDING BEARINGS CO., LTD., Zhejiang (CN)

(72) Inventors: Zhihua Sun, Zhejiang (CN); Zhongquan Lu, Zhejiang (CN)

(73) Assignee: ZHEJIANG CHANGSHENG SLIDING BEARINGS CO., LTD., Zhejiang (CN)

(*) Notice: Subject to any disclaimer, the term of this patent is extended or adjusted under 35 U.S.C. 154(b) by 0 days.

(21) Appl. No.: 14/392,361

(22) PCT Filed: Sep. 10, 2013

(86) PCT No.: PCT/CN2013/083174
§ 371 (c)(1),
(2) Date: Dec. 23, 2015

(87) PCT Pub. No.: WO2014/205915
PCT Pub. Date: Dec. 31, 2014

(65) Prior Publication Data
US 2016/0199909 A1    Jul. 14, 2016

(30) Foreign Application Priority Data

Jun. 26, 2013  (CN) .......................... 2013 1 0261328
Jun. 26, 2013  (CN) ..................... 2013 2 0374029 U

(51) Int. Cl.
*F16C 33/10*  (2006.01)
*B22F 1/00*  (2006.01)
(Continued)

(52) U.S. Cl.
CPC .......... *F16C 33/104* (2013.01); *B22F 1/0003* (2013.01); *B22F 7/04* (2013.01);
(Continued)

(58) Field of Classification Search
None
See application file for complete search history.

(56) References Cited

U.S. PATENT DOCUMENTS 2,788,324 A * 4/1957 Mitchell ................. F16C 33/20
                                                            29/898.1
3,369,924 A * 2/1968 Duggins ............. C22C 32/0094
                                                            384/279
(Continued)

FOREIGN PATENT DOCUMENTS

CN    1488865 A    4/2004
CN    1991188 A    7/2007
(Continued)

OTHER PUBLICATIONS

Office Action dated Nov. 3, 2015 in Chinese Patent Application No. 2013102613284, with English summary of the Office Action.
(Continued)

*Primary Examiner* — Michael P Rodriguez
(74) *Attorney, Agent, or Firm* — Vierra Magen Marcus LLP

(57) ABSTRACT

A metal matrix self-lubricating composite and a manufacturing method therefor. The metal matrix self-lubricating composite comprises a metal matrix and a mixture layer compounded on a surface of the metal matrix, the mixed layer comprising a copper alloy and a self-lubricating material. The method for manufacturing the metal matrix self-lubricating composite comprises the following steps: a) sintering copper alloy powder on a surface of a metal matrix to form a copper alloy layer on the surface of the metal
(Continued)

matrix; b) blade-coating or dip-coating a lubricating material on a surface of the copper alloy layer, and performing vacuumization to obtain a metal plate, and drying the metal plate; c) repeating step b) for multiple times; and d) sintering the metal plate obtained in step c) to obtain the metal matrix self-lubricating composite. In the present invention, a vacuumization mode is used and vacuumization operations are repeated, so that a dense mixture layer on which a self-lubricating material is dispersed on a copper alloy is formed, and the metal matrix self-lubricating composite has good lubricity and abrasion resistance.

3 Claims, 1 Drawing Sheet

(51) Int. Cl.

| | | |
|---|---|---|
| *C22C 9/00* | (2006.01) | |
| *C22C 9/01* | (2006.01) | |
| *C22C 9/02* | (2006.01) | |
| *F16C 33/12* | (2006.01) | |
| *F16C 33/14* | (2006.01) | |
| *B22F 7/04* | (2006.01) | |

(52) U.S. Cl.
CPC .................. *C22C 9/00* (2013.01); *C22C 9/01* (2013.01); *C22C 9/02* (2013.01); *F16C 33/1095* (2013.01); *F16C 33/128* (2013.01); *F16C 33/145* (2013.01); *B22F 2007/042* (2013.01); *B22F 2301/10* (2013.01); *B22F 2998/10* (2013.01); *F16C 2204/10* (2013.01); *F16C 2208/58* (2013.01)

(56) References Cited

U.S. PATENT DOCUMENTS

| | | | |
|---|---|---|---|
| 4,740,340 A | * | 4/1988 | Pratt .................... F16C 33/201 264/112 |
| 5,732,322 A | | 3/1998 | Nakamaru et al. |
| 6,042,778 A | | 3/2000 | Kraft et al. |

FOREIGN PATENT DOCUMENTS

| | | |
|---|---|---|
| CN | 101074702 A | 11/2007 |
| CN | 201027811 Y | 2/2008 |
| CN | 101407123 A | 4/2009 |
| CN | 101871058 A | 10/2010 |
| CN | 102168202 A | 8/2011 |
| CN | 102390139 A | 3/2012 |
| EP | 1412112 A1 | 4/2004 |
| JP | 58153706 A | 9/1983 |
| JP | 63176819 A | 7/1988 |
| JP | 10330774 A | 12/1998 |
| JP | 2007085363 A | 4/2007 |
| JP | 2009079136 A | 4/2009 |

OTHER PUBLICATIONS

International Search Report and Written Opinion dated Apr. 3, 2014, in International Application No. PCT/CN2013/083174.
Wang, Yanjun et al., "Fabrication and Properties of Infiltrated-type High Temperature Self-lubricating Cermet Composite and Properties Thereof,", Materials for Mechanical Engineering, Jul. 2010, vol. 34, No. 7, pp. 42-45.
International Search Report and Written Opinion in International Application No. PCT/CN2013/083174.
European Search Report dated May 11, 2017, in European Application No. 13888335.0.

* cited by examiner

METAL MATRIX SELF-LUBRICATING COMPOSITE AND MANUFACTURING METHOD THEREFOR

The present invention claims priority to Chinese Patent Application No. 201310261328.4 filed with Chinese Patent Office on Jun. 26, 2013, and titled "Metal Matrix Self-Lubricating Composite and Manufacturing Method Therefor" as well as Chinese Patent Application No. 201320374029.7 filed with Chinese Patent Office on Jun. 26, 2013, and titled "Metal Matrix Self-lubricating Composite", which are incorporated herein by reference in their entirety.

FIELD OF THE INVENTION

The present invention relates to the field of composite, in particular to a metal matrix self-lubricating composite and a method for manufacturing the same.

BACKGROUND OF THE INVENTION

Sliding bearing is a bearing operating under sliding friction. Sliding bearing is needed in high-speed, heavy-load and high-precision occasions as well as occasions where structural split is needed. Currently, sliding bearings made of steel-copper alloy laminated composite are used frequently, as such bearings have high bearing capacity, good abrasion resistance and low usage cost. However, sliding bearings have to be sufficiently lubricated in the process of utilization, whereas the lubricant additionally added in the early stage of utilization cannot enter the friction surface sufficiently and thus the lubrication is insufficient, leading to initial wear or "nipping" phenomenon. With respect to the drawbacks of sliding bearing made of steel-copper alloy composite, researchers have developed novel materials for sliding bearing, i.e. a matrix material coated with a lubricating layer on a surface thereof.

For example, Chinese Patent No. 200720068200.6 discloses a bimetal bearing sprayed with a lubricating layer; the bearing includes an open type bearing or a plate made of a composite laminating at least two materials of steel and copper alloys, wherein the surface of the copper alloy layer is sprayed with a layer of lubricating film. Chinese Patent No. 200810153158.7 discloses a wear-resistant-copper-based gradient material and a method for manufacturing the same, wherein the material has a three-layer structure with a material of one outer layer being copper-zirconium oxide, a material of the other outer layer being copper-graphite and a material of the middle layer being pure copper. It is required that sliding bearings have good lubricity and abrasion resistance in practical application. The bearings disclosed in the two patent documents above have good lubricity and abrasion resistance, but they are still not very ideal. Therefore, the present application provides a metal matrix self-lubricating composite and a method for manufacturing the same.

SUMMARY OF THE INVENTION

A technical problem solved in the present invention is to provide a manufacturing method for a metal matrix self-lubricating composite, and the metal matrix self-lubricating composite manufactured according to the present invention has good lubricity and abrasion resistance.

In light of this, the present invention provides a method for manufacturing a metal matrix self-lubricating composite, including the steps of:

a) sintering copper alloy powder on a surface of a metal matrix to form a copper alloy layer on the surface of the metal matrix;

b) blade-coating or dip-coating a self-lubricating material on a surface of the copper alloy layer, then performing vacuum pumping to obtain a metal plate, and drying the metal plate;

c) repeating step b) for multiple times; and d) sintering the metal plate obtained in step c) to obtain the metal matrix self-lubricating composite.

Preferably, the copper alloy powder has a particle size of 60 to 200 mesh.

Preferably, the copper alloy layer has a thickness greater than 0.3 mm.

Preferably, the self-lubricating material is one or both of a polymeric material and an inorganic solid self-lubricating material.

Preferably, the polymeric material is one or more selected from the group consisting of polytetrafluoroethylene, polyamide, polyimide, polyformaldehyde and polyetheretherketone.

Preferably, the inorganic solid self-lubricating material includes one or both of molybdenumdisulfide and graphite.

Preferably, the vacuum level of the vacuum pumping in step b) is greater than 0.07 MPa.

The present invention also provides a metal matrix self-lubricating composite comprising: metal matrix and a mixed layer superimposed on a surface of the metal matrix, the mixed layer comprising a copper alloy and a self-lubricating material.

Preferably, the copper alloy layer has a thickness greater than 0.3 mm.

Preferably, the self-lubricating material is one or both of a polymeric material and an inorganic solid self-lubricating material.

Preferably, the polymeric material is one or more of polytetrafluoroethylene, polyamide, polyimide, polyformaldehyde and polyetheretherketone.

Preferably, the inorganic solid self-lubricating material includes one or both of molybdenumdisulfide and graphite.

The present invention provides a metal matrix self-lubricating composite comprising: a metal matrix and a mixed layer provided on a surface of the metal matrix, wherein the mixed layer comprises a copper alloy and a self-lubricating material. The present invention also provides a method for manufacturing the metal matrix self-lubricating composite: first, copper alloy powder is sintered on a surface of a metal matrix to form a copper alloy layer on the surface of the metal matrix; then a self-lubricating material is blade-coated or dip-coated on a surface of the copper alloy layer, and dried after vacuum pumping so that the self-lubricating material permeates into the copper alloy layer to be dispersed in the copper alloy layer; these steps are repeated for multiple times; finally, the material is sintered to produce the metal matrix self-lubricating composite. In the present invention, by blade-coating the self-lubricating material on a surface of the copper alloy layer for multiple times and by vacuum pumping, the self-lubricating material is allowed to permeate into the copper layer to form a dense mixed layer, resulting in the metal matrix self-lubricating composite having good lubricity and abrasion resistance.

DETAILED DESCRIPTION OF THE INVENTION

To further understand the present invention, the preferred embodiments of the present invention are described below in combination with the examples, but it should be understood that these descriptions are to further illustrate the features and advantages of the present invention only, rather than to limit the claims of the present invention.

Figure 1:
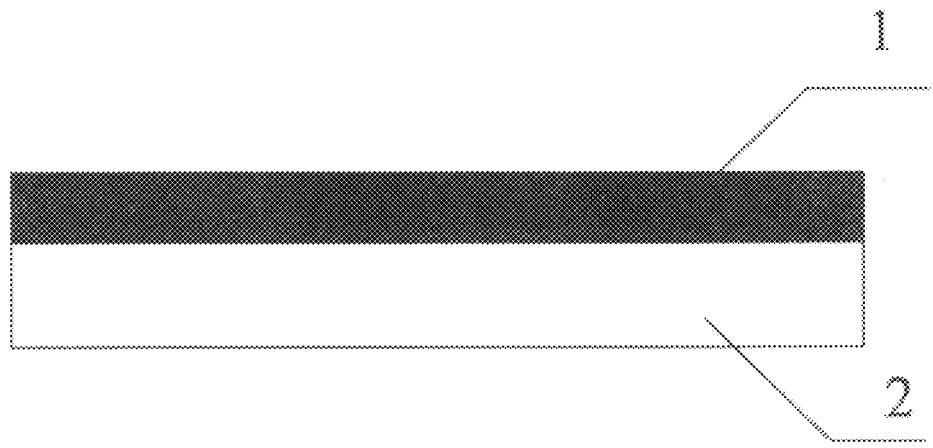
FIG. 1 is a schematic illustration of the structure of the self-lubricating material according to the present invention.

An example of the present invention discloses a metal matrix self-lubricating composite, as shown in FIG. 1, which is a schematic illustration of the structure of the metal matrix self-lubricating composite according to the present invention. The metal matrix self-lubricating composite comprises: a metal matrix and a mixed layer superimposed on a surface of the metal matrix, wherein the mixed layer comprises a copper alloy and a self-lubricating material.

According to the present invention, the metal matrix self-lubricating composite has a thickness of preferably 1-30 mm, and the mixed layer has a thickness preferably larger than 0.3 mm, and more preferably of 0.5-3 mm.

The metal matrix described in the present invention includes, but is not limited to, carbon steel, stainless steel or copper, and is preferably cold-rolled carbon steel thin sheet or cold-rolled carbon steel strip in the present application. The copper alloy includes at least copper element, as well as other alloying elements which are preferably one or several elements selected from the group consisting of tin, zinc, aluminum, lead, manganese, iron and nickel. Accordingly, the copper alloy may be alloy of copper, tin and lead; and also alloy of copper and tin. Complex alloy of copper, tin, zinc, aluminum, lead, manganese, iron and nickel elements is also possible. The copper alloy may have a composition of 10 wt % tin and 10 wt % lead with copper being the balance, or may have a composition of 8-13 wt % tin with copper being the balance. The mass ratio of the copper alloy and the lubricating material is preferably 1:(0.02-0.2), and more preferably 1:(0.05-0.15).

The self-lubricating material may be a polymeric material, an inorganic solid self-lubricating material, or a mixture of the polymeric material and the inorganic solid self-lubricating material. The polymeric material is preferably one or more of polytetrafluoroethylene, polyamide, polyimide, polyformaldehyde and polyetheretherketone, and more preferably polytetrafluoroethylene; and the inorganic solid self-lubricating material is preferably one or both of molybdenumdisulfide and graphite. When the metal matrix self-lubricating composite according to the present invention is used under high temperatures, the self-lubricating material is preferably one or both of molybdenumdisulfide and graphite. As a preferred embodiment, the self-lubricating material is a liquid paste-like mixture of graphite, molybdenumdisulfide and polytetrafluoroethylene with a content of polytetrafluoroethylene preferably greater than 50 wt %. As a preferred embodiment, the mass ratio of graphite, molybdenumdisulfide and polytetrafluoroethylene is preferably (0.2-0.3):1:(3-4). The polytetrafluoroethylene has a low fraction coefficient of 0.04-0.05 in general and 0.016 under heavy load. The polytetrafluoroethylene has a layered structure in which the binding force is strong in the same layer, but weak between layers which are thus extremely easy to slide relatively. Molybdenum disulfide has a layered structure that belongs to hexagonal system and is extremely easy to split between layers, thus exhibiting a good self-lubricating property. Molybdenum disulfide is capable of strongly adsorbing to a strong adsorption to a metal surface that is hard to damage even under friction, thus being able to bear a heavy load. The surface lubricating material of the metal matrix self-lubricating composite described in the present invention is dispersed in the copper alloy layer.

The present invention provides a metal matrix self-lubricating composite comprising a metal matrix and a mixed layer provided on a surface of the metal matrix, wherein the mixed layer consists of a copper alloy and a self-lubricating material. As the mixed layer in which the self-lubricating material is dispersed in the copper alloy is provided on a surface of the metal matrix, the metal matrix self-lubricating composite has good abrasion resistance and lubricity. The metal matrix self-lubricating composite described in the present invention is subjected to mechanical processing to obtain sliding plates or sleeves, in which the mechanical processing is well known to those skilled in the art and is not particularly limited in the present invention. The sliding plates or sleeves made from the metal matrix self-lubricating composite according to the present invention may be applied to automobile tire molds. In the application process under practical working conditions, due to a high temperature of the working environment and a certain pressure applied to the metal matrix self-lubricating composite, the self-lubricating material in the mixed layer of the composite will expand under heat and be squeezed under pressure, such that the lubricating material in the mixed layer is extruded to a surface of the mixed layer, thereby achieving a lubricating effect.

The present invention also provides a method for manufacturing a metal matrix self-lubricating composite, including the steps of:

a) sintering copper alloy powder on a surface of a metal matrix to form a copper alloy layer on the surface of the metal matrix;

b) blade-coating or dip-coating a self-lubricating material on a surface of the copper alloy layer, then performing vacuum pumping to obtain a metal plate, and drying the metal plate;

c) repeating step b) for multiple times; and d) sintering a metal plate obtained in step c) to obtain the metal matrix self-lubricating composite.

According to the present invention, in the process of manufacturing the metal matrix self-lubricating composite, first the copper alloy powder is sintered on a surface of a metal matrix to form a copper alloy layer on the surface of the metal matrix. Among those, the metal matrix includes, but is not limited to, carbon steel, stainless steel or copper, and is preferably cold-rolled carbon steel thin sheet or cold-rolled carbon steel strip in the present application. When the metal matrix is a cold-rolled carbon steel thin sheet plated with copper on its surface, the sintering is preferably conducted at a sintering linear velocity of preferably 260-350 mm/min in a sintering furnace with nine regions, in which regions 1-2 have a sintering temperature of preferably 750-840° C. and regions 3-9 have a sintering temperature of preferably 810-840° C. If the metal matrix is a cold-rolled carbon steel strip, the sintering is preferably conducted at a sintering linear velocity of preferably 590-610 mm/min in a sintering furnace with twelve regions, in which regions 1-2 have a sintering temperature of preferably 700-820° C. and regions 3-12 have a sintering temperature of preferably 790-820° C. The sintering described above is conducted in multiple regions to ensure close binding between the copper alloy layer and the metal matrix.

The copper alloy powder described in the present invention has a particle size of preferably 60-200 mesh, and more preferably 100-140 mesh, as a larger particle size of the copper alloy powder ensures a larger bearing capacity of the obtained copper alloy layer and favors greater permeation of the self-lubricating material into voids among the copper alloy powder. The copper alloy powder includes at least copper powder; and the copper alloy powder further comprises powder of other alloying elements which are preferably one or more of tin, zinc, aluminum, lead, manganese, iron and nickel. The metal composite has a thickness of preferably 1-30 mm and the copper alloy layer has a thickness of preferably 0.5-3 mm.

In the present invention, after the sintering of the copper alloy layer is completed, a self-lubricating material is blade-coated or dip-coated on a surface of the copper alloy layer, and vacuum pumping is performed to obtain a metal plate. The self-lubricating material may be a polymeric material, an inorganic solid self-lubricating material, or a mixture of the polymeric material and the inorganic solid self-lubricating material. The polymeric material is preferably one or more selected from the group consisting of polytetrafluoroethylene, polyamide, polyimide, polyformaldehyde and polyetheretherketone, and more preferably polytetrafluoroethylene; and the inorganic solid self-lubricating material is preferably one or both of molybdenumdisulfide and graphite. When the metal matrix self-lubricating composite according to the present invention is used under high temperatures, the self-lubricating material is preferably one or both of molybdenumdisulfide and graphite. As a preferred embodiment, the self-lubricating material is a liquid paste-like mixture of graphite, molybdenumdisulfide and polytetrafluoroethylene with a content of polytetrafluoroethylene preferably greater than 50 wt %. As a preferred embodiment, the mass ratio of graphite, molybdenumdisulfide and polytetrafluoroethylene is preferably (0.2-0.3):1:(3-4).

According to the present invention, a self-lubricating material is blade-coated or dip-coated on a surface of the copper alloy layer. The blade-coating, as a means well known by those skilled in the art, preferably employs a doctor blade for blade-coating the surface of the copper alloy layer; and the dip-coating is conducted by placing the metal matrix sintered with a copper alloy layer into a lubricating material. In the present invention, the self-lubricating material is preferably blade-coated on the surface of the copper alloy layer using a blade-coating means. In the present application, after the self-lubricating material is blade-coated or dip-coated on a surface of the copper alloy layer, it is preferably placed in a container with a vacuum device to perform vacuum pumping, so that the self-lubricating material is able to permeate into voids in the copper alloy layer. The vacuum level of the vacuum pumping is greater than 0.07 MPa and is preferably 0.08-0.09 MPa. More residual gas in case of a low vacuum level prevents the self-lubricating material from permeating into the copper alloy layer sufficiently.

The surface of the copper alloy layer is coated with a self-lubricating material using a blade-coating means, and touched up with the self-lubricating material in case of sagging of the copper alloy surface after performing vacuum pumping. Thereafter, the metal plate is dried to remove the solvent in the self-lubricating material at a temperature of preferably 140-160° C. for a duration of preferably 15 to 45 min. In the present invention, in order to allow self-lubricating material as much as possible to permeate into the void in the copper alloy layer, the steps of blade-coating the self-lubricating material, performing vacuum pumping and drying are repeated on the metal plate so that more self-lubricating material permeates into the voids in the copper alloy layer, ensuring the formation of a dense mixed layer on the metal plate surface and thus improving abrasion resistance of the metal matrix self-lubricating composite. However, in order to reduce costs and to improve working efficiency, the steps of blade-coating the self-lubricating material, performing vacuum pumping and drying are preferably conducted twice on the copper alloy layer in the present application.

Finally, the metal plate after drying is sintered. The sintering enables polytetrafluoroethylene to form a web-like cross-linking structure, thereby making the metal matrix self-lubricating composite reach its highest strength. The sintering is preferably conducted in nitrogen atmosphere at a temperature of preferably 370-390° C. for a duration of preferably 36 to 45 min, in which the nitrogen has a purity above 99.9%.

The present invention also provides a method for manufacturing the metal matrix self-lubricating composite: first, copper alloy powder is sintered on a surface of a metal matrix to form a copper alloy layer on the surface of the metal matrix; then a self-lubricating material is blade-coated on a surface of the copper alloy layer and dried after performing vacuum pumping, these steps are repeated for multiple times so that the self-lubricating material permeates into the copper alloy layer to be dispersed in the copper alloy layer; at last the material is sintered to thereby obtain the metal matrix self-lubricating composite. In the present application, the self-lubricating material permeates into voids in the copper alloy powder to form a dense mixed layer by blade-coating the self-lubricating material on a surface of the copper alloy layer for multiple times and by performing vacuum pumping, so that the metal matrix self-lubricating composite has good lubricity, abrasion resistance and bearing capacity.

To further illustrate the present invention, the metal matrix self-lubricating composite provided in the present invention and the manufacturing method thereof are described in detail in combination with the examples below, but the scope claimed in the present invention is not limited to the following examples.

The starting materials in the following examples are all commercial available products.

EXAMPLE 1

1.8 mm cold-rolled carbon steel thin sheet provided by a company serving as a metal matrix, copper alloy powder having a particle size of 60-200 mesh was coated on one surface of the metal matrix, wherein the copper alloy powder included 10 wt % tin and 10 wt % lead with the balance being copper; then the metal matrix was sintered sequentially in nine regions of a'sintering furnace where regions 1-2 of the sintering furnace had a furnace temperature of 750° C. and regions 3-9 had a furnace temperature of 810° C., the linear velocity of the sintering being 260 mm/min; after the sintering was completed, a copper alloy layer with a thickness of 1.2±0.1 mm was formed on the surface of the metal matrix.

Colloidal graphite, molybdenumdisulfide and polytetrafluoroethylene were formulated into 1000 g of self-lubricating material in a weight ratio of 0.25:1:3.5.

A layer of the self-lubricating material was blade-coated on a surface of the copper alloy layer using a doctor blade and the self-lubricating material on other surfaces of the metal matrix was wiped away with acetone; then the metal matrix having a surface coated with the self-lubricating material was placed in a container with a vacuum device and evacuation was performed to reach a vacuum level of 0.07 MPa, thus obtaining a metal plate; after the metal plate was taken out, the surface of the copper alloy layer was touched up with the self-lubricating material in case of sagging, and the self-lubricating material on other surfaces of the metal plate was removed with acetone; then the metal plate was dried in an oven at a temperature of 150° C., and after drying for 20 min the excess self-lubricating material was scraped off the metal plate.

A layer of the self-lubricating material was blade-coated again on the surface of the copper alloy layer of the metal plate using a doctor blade and the self-lubricating material on other surfaces of the metal plate was wiped away with acetone; then it was placed in a container with a vacuum device and evacuation was performed to reach a vacuum level of 0.08 MPa; after the metal plate was taken out, the surface of the copper alloy layer was touched up with the self-lubricating material in case of sagging, and the self-lubricating material on other surfaces of the metal plate was removed with acetone; next, the metal plate was dried in an oven at a temperature of 150° C., and after drying for 20 min the excess self-lubricating material was scraped off the metal plate.

The metal plate was sintered in a sintering furnace under nitrogen protection at a sintering temperature of 370° C. for a duration of 36 min, in which the nitrogen had a purity of 99.9%; then the obtained metal plate was surface polished and flat-rolled to a thickness of 3.0±0.015 mm, thus obtaining the metal matrix self-lubricating composite.

Figure 2:
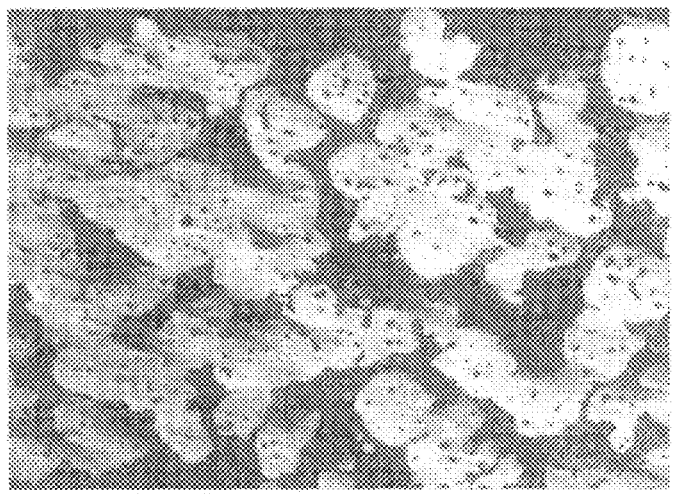
FIG. 2 is a metallographic picture of the mixed layer of the metal matrix self-lubricating composite manufactured in Example 1 of the present invention.

As shown in FIG. 1, as a schematic illustration of the structure of the metal matrix self-lubricating composite according to the present invention, 1 is a mixed layer and 2 is a metal matrix. FIG. 2 shows a metallographic picture of a mixed layer of the metal matrix self-lubricating composite manufactured in this example, where the white region is the copper alloy in which the self-lubricating material is dispersed.

Friction and wear tests were conducted on the metal matrix self-lubricating composite manufactured in this example with a sliding plate reciprocating friction and wear tester, test conditions being: ① dry friction; ② speed 3 m/min; ③ pressure 5 MPa; ④ reciprocating stroke: 500 mm; ⑤ counter friction part: 45# steel, HRC42-47. The test results are shown in Table 1.

EXAMPLE 2

2 mm cold-rolled carbon steel thin sheet serving as metal matrix, copper alloy powder having a particle size of 100-140 mesh was coated on one surface of the metal matrix, wherein the copper alloy powder included 8 wt % tin with copper being the balance; then the metal matrix was sintered sequentially in nine regions of a sintering furnace where regions 1-2 of the sintering furnace had a furnace temperature of 750° C. and regions 3-9 had a furnace temperature of 810° C., the linear velocity of the sintering being 350 mm/min; after the sintering was completed, a copper alloy layer with a thickness of 2.5 mm was formed on the surface of the metal matrix.

Colloidal graphite, molybdenumdisulfide and polytetrafluoroethylene were formulated into 1000 g of self-lubricating material in a weight ratio of 0.25:1:3.5.

A layer of the self-lubricating material was blade-coated on the surface of the copper alloy layer using a doctor blade and the self-lubricating material on the back of the metal matrix was wiped away with acetone; then the metal matrix having a surface coated with the lubricating material was placed in a container with a vacuum device and evacuation was performed to reach a vacuum level of 0.08 MPa, thus obtaining a metal plate; after the metal plate was taken out, the surface of the copper alloy layer was touched up with the self-lubricating material in case of sagging, and the self-lubricating material on other surfaces of the metal plate was removed with acetone; next, the metal plate was dried in an oven at a temperature of 160° C. for a duration of 15 min, and after drying the excess self-lubricating material was scraped off the metal plate.

A layer of the self-lubricating material was blade-coated again on the surface of the copper alloy layer of the metal plate using a doctor blade and the self-lubricating material on other surfaces of the metal plate was wiped away with acetone; then it was placed in a container with a vacuum device and evacuation was performed to reach a vacuum level of 0.08 MPa; after the metal plate was taken out, the surface of the copper alloy layer was touched up with the self-lubricating material in case of sagging, and the self-lubricating material on other surfaces of the metal plate was removed with acetone; next, the metal plate was dried in an oven at a temperature of 140° C., and after drying for 20 min the excess self-lubricating material was scraped off the metal plate.

The metal plate was sintered in a sintering furnace under nitrogen protection at a sintering temperature of 370° C. for a duration of 36 min, wherein the nitrogen had a purity of 99.9%; then the obtained metal plate was surface polished and flat-rolled to a thickness of 3.0±0.015 mm, thus obtaining the metal matrix self-lubricating composite.

Friction and wear tests were conducted on the metal matrix self-lubricating composite manufactured in this example with a sliding plate reciprocating friction and wear tester, test conditions being: ① dry friction; ② speed 3 m/min; ③ pressure 5 MPa; ④ reciprocating stroke: 500 mm; ⑤ counter friction part: 45# steel, HRC42-47. The test results are shown in Table 1.

EXAMPLE 3

The manufacturing method was the same as that in Example 1, except that the copper alloy powder included 8-10 wt % aluminum, 3-5 wt % iron, 0.3-0.7 wt % nickel and copper being the balance.

EXAMPLE 4

The manufacturing method was the same as that in Example 1, except that 1000 g of self-lubricating material was formulated with molybdenumdisulfide and graphite in a weight ratio of 1:1.

Comparative Example 1

1.8 mm cold-rolled carbon steel thin sheet serving as metal matrix, copper powder having a particle size of 100-140 mesh was coated on one surface of the metal matrix; then the metal matrix was sintered sequentially in nine regions of the sintering furnace where regions 1-2 of the sintering furnace had a furnace temperature of 750° C. and regions 3-9 had a furnace temperature of 810° C., the linear velocity of the sintering being 350 min/min; after the sintering was completed, a copper layer with a thickness of 1.3 mm was formed on the surface of the metal matrix;

Colloidal graphite, molybdenumdisulfide and polytetrafluoroethylene were formulated into a self-lubricating material in a weight ratio of 0.25:1:3.5; the self-lubricating material was spread and rolled onto the copper powder layer in a thickness of 0.01-0.03 mm; the metal matrix covered with the self-lubricating material was dried at 280° C. for 20 min, and the dried plate was rolled again with a rolling reduction of 0.01-0.03 mm; the rolled plate was sintered in a sintering furnace under nitrogen protection at a sintering temperature of 370° C. for 36 min; the sintered plate was finish rolled to meet the requirements for a finished plate at a rolling reduction of at least 0.01 mm or more, thus obtaining the metal matrix self-lubricating composite.

Friction and wear tests were conducted on the metal matrix self-lubricating composite manufactured in this comparative example with a sliding plate reciprocating friction and wear tester, test conditions being: ① dry friction; ② speed 3 m/min; ③ pressure 5 MPa; ④ reciprocating stroke: 500 mm; ⑤ counter friction part: 45# steel, HRC42-47. The test results are shown in Table 1.

TABLE 1

Friction and Wear Data of the Metal Matrix Self-lubricating Composites Manufactured in the Examples and Comparative Example

| Group | Final Wear (mm) | Final Temperature (° C.) | Average Friction Coefficient | Test Time |
|---|---|---|---|---|
| Example 1 | 0.011 | 70 | 0.097 | 50 h |
| Example 2 | 0.008 | 57 | 0.095 | 50 h |
| Comparative Example 1 | 0.037 | 101 | 0.208 | 50 h |

The metal matrix self-lubricating composite provided in the present invention and the manufacturing method thereof have been described above in detail. Specific examples have been used herein to explain the principle and embodiments of the present invention, whereas the description of the examples above is to facilitate understanding the method and core concept of the present invention only. It should be pointed out that for those skilled in the art, several improvements and modifications may also be made to the present invention without departing from the inventive principle and these improvements and modifications fall into the scope claimed by the claims of the present invention as well.

The invention claimed is:

1. A manufacturing method for a metal matrix self-lubricating composite, including the steps of:
   a) sintering copper alloy powder on a surface of a metal matrix to form a copper alloy layer on the surface of the metal matrix;
   b) blade-coating or dip-coating a self-lubricating material on a surface of the copper alloy layer, then performing vacuum pumping to obtain a metal plate, and drying the metal plate;
   c) repeating step b) for multiple times; and
   d) sintering the metal plate obtained in step c) to obtain the metal matrix self-lubricating composite;
   wherein the self-lubricating material is a liquid paste-like mixture of graphite, molybdenum disulfide and polytetrafluoroethylene with a content of polytetrafluoroethylene greater than 50 wt %, and the mass ratio of graphite, molybdenum disulfide and polytetrafluoroethylene is (0.2-0.3):1:(3-4); and
   the sintering in step d) is conducted in nitrogen atmosphere at a temperature of 370-390° C. for a duration of 36 to 45 minutes in which the nitrogen has a purity above 99.9%.

2. The manufacturing method of claim 1, wherein the copper alloy layer has a thickness greater than 0.3 mm.

3. The manufacturing method of claim 1, wherein a vacuum level of the vacuum pumping in step b) is greater than 0.07 MPa.

* * * * *